(12) United States Patent
Ozawa et al.

(10) Patent No.: US 11,505,079 B2
(45) Date of Patent: Nov. 22, 2022

(54) HYBRID VEHICLE AND METHOD FOR CONTROLLING HYBRID VEHICLE

(71) Applicant: Toyota Jidosha Kabushiki Kaisha, Toyota (JP)

(72) Inventors: Tamaki Ozawa, Toyota (JP); Masaaki Kiyohara, Anjo (JP); Toshiyuki Nagase, Nisshin (JP); Hajime Kushima, Toyota (JP); Yuki Shimizu, Toyota (JP); Akio Uotani, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 525 days.

(21) Appl. No.: 16/717,163

(22) Filed: Dec. 17, 2019

(65) Prior Publication Data

US 2020/0207235 A1    Jul. 2, 2020

(30) Foreign Application Priority Data

Dec. 26, 2018  (JP) .............................. JP2018-242845

(51) Int. Cl.
| | |
|---|---|
| *B60L 53/63* | (2019.01) |
| *G08G 1/00* | (2006.01) |
| *G06Q 30/06* | (2012.01) |
| *B60L 53/51* | (2019.01) |
| *B60W 20/10* | (2016.01) |
| *B60L 53/66* | (2019.01) |

(52) U.S. Cl.
CPC .............. *B60L 53/63* (2019.02); *B60L 53/51* (2019.02); *B60W 20/10* (2013.01); *G06Q 30/0645* (2013.01); *G08G 1/205* (2013.01); *B60L 53/665* (2019.02); *B60W 2510/244* (2013.01)

(58) Field of Classification Search
CPC ........ B60L 53/63; B60L 53/51; B60L 53/665; B60L 2250/12; B60L 2250/54; B60L 50/16; B60L 55/16; B60W 20/10; B60W 20/12; B60W 2510/244; G06Q 30/0645; G08G 1/205; G08G 1/202
See application file for complete search history.

(56) References Cited

U.S. PATENT DOCUMENTS

| | | | |
|---|---|---|---|
| 2014/0100708 A1 | 4/2014 | Ukita et al. | |
| 2019/0156379 A1* | 5/2019 | Igata | ................ G06Q 30/0283 |
| 2019/0172083 A1* | 6/2019 | Igata | ................ G06Q 30/0206 |
| 2019/0172106 A1* | 6/2019 | Igata | .................... G06Q 50/30 |

FOREIGN PATENT DOCUMENTS

| | | |
|---|---|---|
| JP | 2013-027154 A | 2/2013 |
| JP | 2013-226007 A | 10/2013 |
| JP | 2015-104157 A | 6/2015 |
| JP | 2015-211482 A | 11/2015 |

\* cited by examiner

*Primary Examiner* — George C Jin
(74) *Attorney, Agent, or Firm* — Dinsmore & Shohl LLP

(57) ABSTRACT

An ECU performs a process including: when a vehicle establishes a Ready-On state, selecting a CD mode; when discharging power is uncompleted and a scheduled time to return the vehicle is a time within a discharging period, setting a second target SOC as a mode switching value; and when the vehicle's power storage device has an SOC reaching the mode switching value and a surcharge imposed on a rental fee is unaccepted, switching the current control mode from the CD mode to a CS mode.

4 Claims, 5 Drawing Sheets

HYBRID VEHICLE AND METHOD FOR CONTROLLING HYBRID VEHICLE

CROSS REFERENCE TO RELATED APPLICATIONS

This nonprovisional application claims priority to Japanese Patent Application No. 2018-242845 filed on Dec. 26, 2018, with the Japan Patent Office, the entire contents of which are hereby incorporated by reference.

BACKGROUND

Field

The present disclosure relates to controlling a hybrid vehicle used for car sharing and capable of transmitting and receiving power to and from a power grid.

Description of the Background Art

In recent years, a technique is known which is used to receive power from a power grid and charge therewith a power storage device mounted in an electric powered vehicle, such as a hybrid vehicle and an electric vehicle, and having a relatively large capacity, and supply power from the electric powered vehicle as a power source via a power grid to another destination receiving power, as seen in a smart grid. When an electric powered vehicle is for example a hybrid vehicle, it can maintain a state of charge of its power storage device by using power generated by its engine while traveling.

Positively utilizing such an electric powered vehicle having a small environmental burden while traveling can contribute to construction of a society with a small environmental burden. One such manner of positively utilizing an electric powered vehicle is for example a plurality of people sharing one or two or more vehicles, or car sharing. For such car sharing, for example, Japanese Patent Laying-Open No. 2015-104157 discloses that when the batteries mounted in a plurality of vehicles shared and thus utilized for a building have their power utilized for that building, a technique is used to make a reservation for utilizing the vehicles for supplying the building with power based on the building's estimated demand for power.

SUMMARY

In recent years, renewable energy generated by solar photovoltaic power generation systems or the like is supplied to power grids to resolve shortage of power supplied during the daytime. However, as solar photovoltaic power generation systems are increasingly used, a daytime demand for power decreases, whereas as more and more electric powered vehicles are used, more and more vehicles are electrically charged at night, resulting in an increased demand for power. As a result, a daily demand for power steeply fluctuates between daytime and nighttime, that is, the demand for power presents a so-called duck curve phenomenon. Accordingly, there is a demand for reduction of fluctuation of a demand for power by using an electric powered vehicle. Such an electric powered vehicle also includes an electric powered vehicle used for car sharing.

The technique disclosed in the above publication only considers accommodating power within the same building, and does not at all take into account or solve problems caused as solar photovoltaic power generation systems and electric powered vehicles are increasingly used.

An object of the present disclosure is to provide a hybrid vehicle used for car-sharing and allowing a power supply source mounted therein and a power grid to transmit and receive power therebetween, that contributes to leveling a demand for power, and a method for controlling the hybrid vehicle.

According to one aspect of the present disclosure a hybrid vehicle is a hybrid vehicle used for a rental service. The present hybrid vehicle includes: an electric motor that generates a driving force; a power storage device that stores power to be supplied to the electric motor; an engine that is used to generate power; a connector connected to a power grid external to the hybrid vehicle to allow the power grid external to the hybrid vehicle and the power storage device to transmit and receive power therebetween while the hybrid vehicle is parked; and a control device that controls the hybrid vehicle in accordance with any one control mode of a first mode and a second mode while the hybrid vehicle is driven, the first mode allowing the hybrid vehicle to travel using the electric motor with the engine stopped, the second mode allowing the hybrid vehicle to travel with the engine operated. The control device switches the first mode to the second mode in response to the power storage device having an SOC decreased to a first target SOC during the first mode. When a scheduled time to return the hybrid vehicle is within a predetermined time zone for which power is supplied from the power storage device to the power grid, the control device switches the first mode to the second mode in response to the power storage device having an SOC decreased to a second target SOC larger than the first target SOC during the first mode.

Thus, when a scheduled time to return the vehicle is within a predetermined time zone, the CD mode is switched to the CS mode when the power storage device has an SOC decreased to the second target SOC. Thus, when the hybrid vehicle is returned within the predetermined time zone at the scheduled time to return the vehicle, the power storage device can supply power to the power grid. Thereby, for example, the power grid can receive power during a period of time for which there is an increased demand for power, which can contribute to leveling the demand for power.

In one embodiment, when the scheduled time to return the hybrid vehicle is within the predetermined time zone, and when an operation performed by a user to indicate that the user accepts a surcharge imposed on a rental fee by continuing the first mode is received, the control device switches the first mode to the second mode in response to the power storage device having an SOC decreased to an SOC lower than the second target SOC during the first mode.

By performing an operation to accept a surcharge imposed on a rental fee, the CD mode is switched from the CS mode when the power storage device has an SOC decreased to an SOC lower than the second target SOC. This allows electrically driven traveling to continue for a longer period of time than when switching the CD mode to the CS mode when an SOC is decreased to the second target SOC.

In still another embodiment, when the scheduled time to return the hybrid vehicle is within the predetermined time zone, and when information indicating that another vehicle owned by a business conductor of the rental service can supply the power grid with power is received, the control device switches the first mode to the second mode in response to the power storage device having an SOC decreased to an SOC lower than the second target SOC during the first mode.

When information indicating that another vehicle owned by a business conductor of the rental service can supply the power grid with power is received, and the CD mode is currently selected, the CD mode is switched to the CS mode in response to the power storage device having an SOC decreased to an SOC lower than the second target SOC while the CD mode is selected. This allows electrically driven traveling to continue for a longer period of time than when switching the CD mode to the CS mode when an SOC is decreased to the second target SOC.

According to another aspect of the present disclosure, a method for controlling a hybrid vehicle is a method of controlling a hybrid vehicle used for a rental service. The hybrid vehicle includes an electric motor that generates a driving force, a power storage device that stores power to be supplied to the electric motor, an engine that is used to generate power, and a connector connected to a power grid external to the hybrid vehicle to allow the power grid external to the hybrid vehicle and the power storage device to transmit and receive power therebetween while the hybrid vehicle is parked. The method includes: controlling the hybrid vehicle in accordance with any one control mode of a first mode and a second mode while the hybrid vehicle is driven, the first mode allowing the hybrid vehicle to travel using the electric motor with the engine stopped, the second mode allowing the hybrid vehicle to travel with the engine operated; switching the first mode to the second mode in response to the power storage device having an SOC decreased to a first target SOC during the first mode; and when a scheduled time to return the hybrid vehicle is within a predetermined time zone for which power is supplied from the power storage device to the power grid, switching the first mode to the second mode in response to the power storage device having an SOC decreased to a second target SOC larger than the first target SOC during the first mode.

The foregoing and other objects, features, aspects and advantages of the present disclosure will become more apparent from the following detailed description of the present disclosure when taken in conjunction with the accompanying drawings.

DETAILED DESCRIPTION

The present disclosure will now be described in embodiments hereinafter in detail with reference to the drawings. In the figures, identical or corresponding components are identically denoted and will not be described repeatedly.

Figure 1:
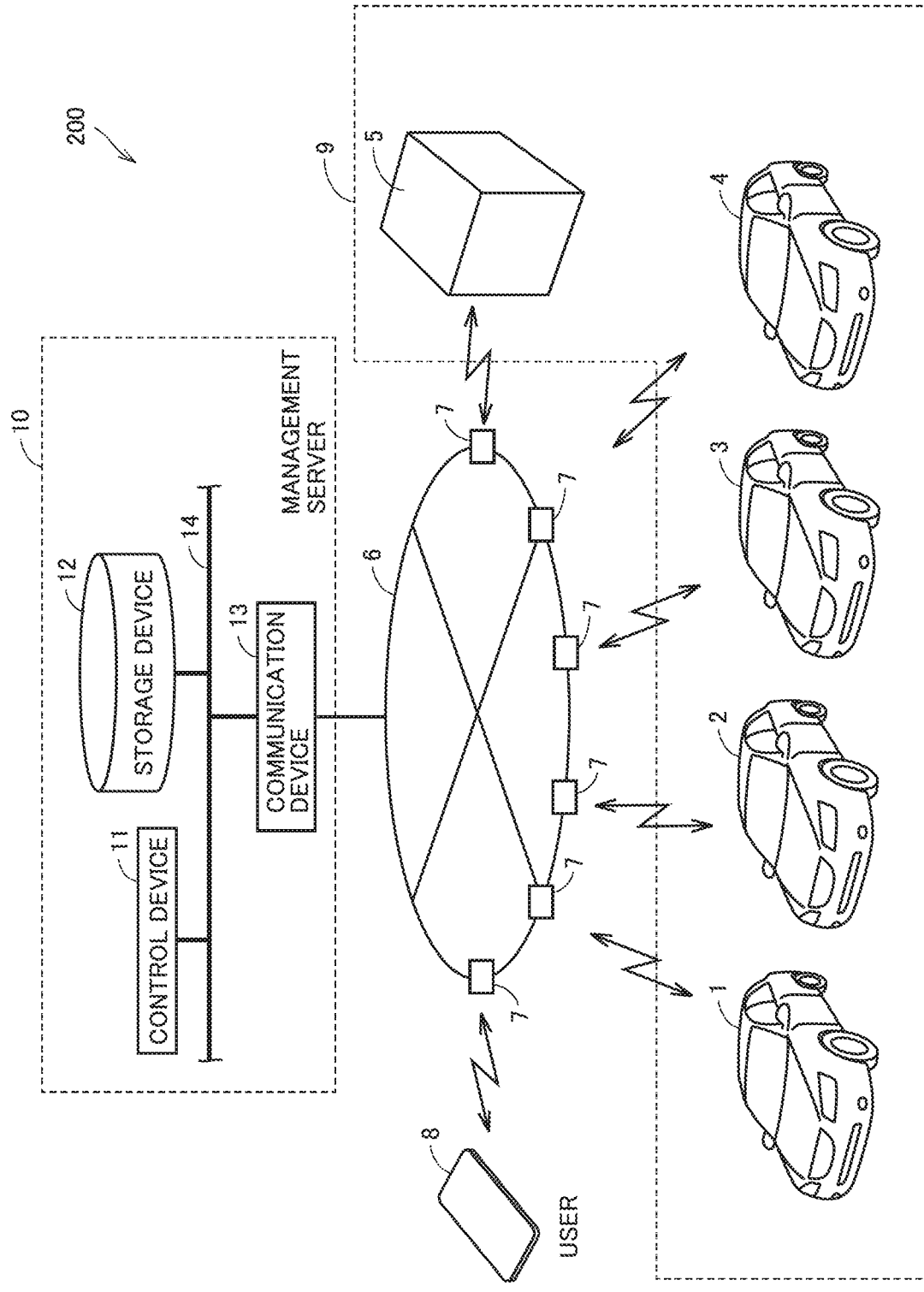
FIG. 1 illustrates an example of a configuration of a vehicle management system in an embodiment.

FIG. 1 illustrates an example of a configuration of a vehicle management system 200 in an embodiment. In the present embodiment, vehicle management system 200 is composed of a management server 10, a charging/discharging device 5 installed in a depot 9, and a plurality of electric powered vehicles 1-4 parked in depot 9 (hereinafter simply referred to as vehicles).

The plurality of vehicles 1 to 4 parked in depot 9 are vehicles used for car sharing. Car sharing is a manner of a utilizing an electric powered vehicle, and it is for example a manner in which a plurality of users share one or two or more electric powered vehicles until a predetermined contract period elapses. A user makes a reservation in advance for using an electric powered vehicle, and visits depot 9 at the reserved date and time and uses any vehicle parked in depot 9. While in the present embodiment, for the sake of illustration, as a manner of using the vehicle, the user returns the vehicle to depot 9 after the user used the vehicle, the user may return the vehicle to a depot other than depot 9.

In the present embodiment, the plurality of vehicles 1 to 4 are each a plug-in hybrid vehicle including a power storage device which can supply power to a driving motor and an engine which generates power that can electrically charge the power storage device and supply power to outside of the vehicle for the sake of illustration. Note that while FIG. 1 only shows four vehicles 1-4 for the sake of illustration, the number of vehicles is not limited to four vehicles.

Vehicle management system 200 is configured such that power of a power storage device mounted in at least some of the plurality of vehicles 1 to 4 connected to charging/discharging device 5 and power generated using the engine are supplied to a power grid connected via charging/discharging device 5 and power from a power grid is supplied via charging/discharging device 5 to a power storage device mounted in at least some of the plurality of vehicles 1 to 4 connected to charging/discharging device 5.

The power storage devices mounted in the plurality of vehicles 1 to 4 parked in depot 9 each have an electric charge remaining therein (hereinafter indicated by a state of charge (SOC)), which is managed by management server 10. Vehicles 1-4 are parked in a predetermined parking space within depot 9, and connected to charging/discharging device 5 via a cable or the like described hereinafter.

Management server 10 is configured to be capable of communicating with a plurality of vehicles including the vehicles 1 to 4 via a base station 7 provided on a communication network 6. Management server 10 is also configured to be capable of communicating with charging/discharging device 5 via communication network 6 and base station 7. Management server 10 may be configured to be capable of communicating with portable terminals 8 (e.g., smart phones) of users of the plurality of vehicles.

Management server 10 has previously stored therein information for identifying vehicles 1 to 4 used for car sharing (hereinafter referred to as a vehicle 1D), and information for identifying depot 9 (hereinafter referred to as a depot ID). A vehicle ID is unique information set for each vehicle. A depot ID is unique information set for each of a plurality of depots including depot 9.

For example, when management server 10 receives a vehicle 1D together with positional information from vehicles 1 to 4 via communication network 6, management server 10 identifies the depot where the vehicle is parked from the received positional information, and thus obtains a depot ID. Management server 10 associates the depot ID with the vehicle 1D and registers them in a management list. By the management list, management server 10 can identify a vehicle parked in depot 9 and determine how many vehicles are parked in depot 9.

Furthermore, management server 10 electrically charges a power storage device mounted in a vehicle parked in depot 9 and supplies (or discharges) power of the power storage device to a power grid by using charging/discharging device 5. How a power storage device is electrically charged and how its power is discharged to a power grid will more specifically be described hereinafter.

Management server 10 includes a control device 11, a storage device 12, and a communication device 13. Control device 11, storage device 12 and communication device 13 are communicably connected to each other by a communication bus 14.

Storage device 12 stores a management list including the above-described depot ID, a vehicle 1D associated with the depot ID, and information associated with the vehicle 1D. The information included in the management list includes, for example, information on whether there is a reservation made, information on a scheduled time to start utilizing a vehicle, information on a scheduled time to return the vehicle (or a scheduled time to stop utilizing the vehicle), and information on a distance planned to be traveled. Communication device 13 implements bidirectional communication between control device 11 and communication network 6.

Although not shown, control device 11 includes a CPU (Central Processing Unit), a memory (a ROM (Read Only Memory) and a RAM (Random Access Memory) etc.), an input/output port for inputting and outputting various signals, and the like. Various types of control executed by control device 11 are executed by software processing, that is, when a program stored in a memory is read by the CPU. Various types of control by control device 11 can also be implemented by a general-purpose server (not shown) executing a program stored in a storage medium. However, various types of control by control device 11 are not limited to software processing, and may instead be processed by dedicated hardware (or an electronic circuit).

A user inputs reservation information using mobile terminal 8 or the like, and the input reservation information is transmitted to management server 10. The reservation information, for example, includes information for specifying a depot at which to rent a vehicle, information on a scheduled time to start utilizing the vehicle, information on a scheduled time to return the vehicle, and information on a distance planned to be traveled.

Management server 10 uses the received reservation information to update the management list, and adjusts the SOCs of the power storage devices mounted in vehicles 1 to 4 parked in depot 9 by using charging/discharging device 5 based on the updated reservation information and other users' reservation information or time zones or the like. Further, management server 10 uses the received reservation information to update the management list, and also sends the reservation information to a vehicle to be reserved.

A specific configuration of vehicles 1 to 4 will be described. Vehicles 1 to 4 share a basic configuration and accordingly, a configuration of vehicle 1 will representatively be described.

Figure 2:
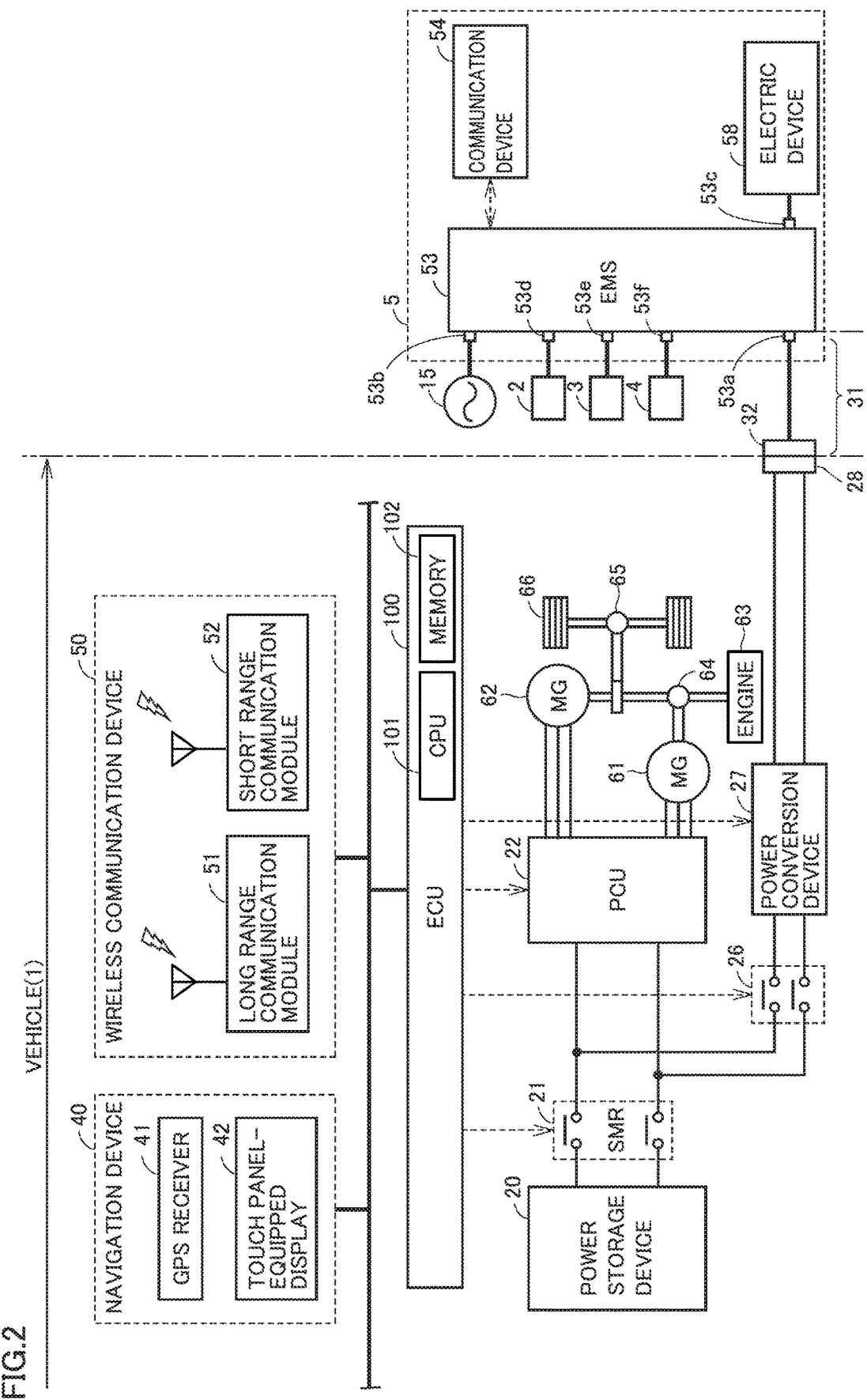
FIG. 2 schematically shows an example of a configuration of a hybrid vehicle according to the present embodiment.

FIG. 2 schematically shows an example of a configuration of hybrid vehicle 1 according to the present embodiment. Referring to FIG. 2, vehicle 1 includes a power storage device 20, a system main relay (SMR) 21, a power control unit (PCU) 22, a first motor generator (hereinafter referred to as a first MG) 61, a second motor generator (hereinafter referred to as a second MG) 62, an engine 63, a power split device 64, a power transmission gear 65, a driving wheel 66, and an ECU (Electronic Control Unit) 100.

Power storage device 20 is a rechargeable direct-current power supply, and configured to include a secondary battery such as a lithium-ion battery or a nickel-metal hydride battery. As power storage device 20, a capacitor such as an electric double layer capacitor can also be employed. Power storage device 20 supplies PCU 22 with power for generating driving force for traveling of vehicle 1. Furthermore, power storage device 20 is: charged with power generated by a power generating operation using first MG 61 and engine 63; charged with power generated by regenerative braking of second MG 62; discharged by a driving operation of first MG 61 or second MG 62; charged with power supplied from an outside of the vehicle; and discharged by supplying power to outside the vehicle.

SMR 21 is electrically connected between power storage device 20 and PCU 22. SMR 21 is closed/opened as controlled in response to a command issued from ECU 100.

PCU 22 operates in response to a command received from ECU 100 to perform power conversion between power storage device 20 and first MG 61 and perform power conversion between power storage device 20 and second MG 62. PCU 22 is configured to include an inverter (not shown) which receives power from power storage device 20 to drive first MG 61 or second MG 62, a converter (not shown) which adjusts the level of the DC voltage supplied to the inverter, and the like.

First MG 61 or second MG 62 are each a 3-phase alternating-current, rotating electric machine which is, for example, a permanent-magnet type synchronous electric motor including a rotor with a permanent magnet buried therein. First MG 61 and second MG 62 both have a function as an electric motor (a motor) and a function as a power generator (a generator). First MG 61 and second MG 62 are connected to power storage device 20 via PCU 22.

For example, when starting engine 63, first MG 61 is driven by the inverter included in PCU 22 to rotate the output shaft of engine 63. When generating power, first MG 61 receives the motive power of engine 63 to generate power. The power generated by first MG 61 is stored in power storage device 20 via PCU 22.

Second MG 62 is driven by the inverter that is included in PCU 22 for example when vehicle 1 travels. Motive power of second MG 62 is transmitted to driving wheel 66 via power transmission gear 65. Furthermore, for example when vehicle 1 is braked, second MG 62 is driven by driving wheel 66 and operates as a power generator to apply regenerative braking. Second MG 62 generates power, which is stored in power storage device 20 via PCU 22.

Engine 63 is a gasoline engine, a diesel engine or a known internal combustion engine which outputs motive power by burning fuel (gasoline or light oil), and is configured such that a throttle angle (or an amount of intake air), an amount of fuel supplied, a timing of ignition, and other conditions for operation are electrically controllable by ECU 100. ECU 100 controls an amount of fuel to be injected, a timing of ignition, an amount of intake air and the like for engine 63 so that engine 63 operates at a target rotational speed and with a target torque that are set based on the state of vehicle 1. The motive power of engine 63 is divided by power split device 64 into a path for transmission to driving wheel 66 and a path for transmission to first MG 61. Power split device 64 is composed for example of a planetary gear mechanism.

Vehicle 1 further includes a charging and discharging relay 26, a power conversion device 27 and an inlet 28 as a configuration for external charging or external power feeding. A connector 32 is coupled to inlet 28. Connector 32 is coupled to an EMS (Energy Management System) 53 of charging/discharging device 5 via a cable 31. While FIG. 2 shows connector 32 attached to inlet 28, connector 32 is configured to be detachable from and attachable to inlet 28, and connector 32 is attached to inlet 28 when external charging or external power feeding is performed, and connector 32 is detached from inlet 28 when vehicle 1 is driven.

When power storage device 20 is externally electrically charged, power is supplied from the EMS 53 side via cable 31, connector 32 and inlet 28, and converted by power conversion device 27 into power capable of charging power storage device 20 (hereinafter referred to as charging power) and the converted, charging power is supplied to power storage device 20. On the other hand, when power storage device 20 externally feeds power, the power is converted by power conversion device 27 into a predetermined power (e.g., AC power), and the converted, AC power is supplied to EMS 53 via inlet 28, connector 32 and cable 31.

Charging and discharging relay 26 is electrically connected between power storage device 20 and power conversion device 27. When charging and discharging relay 26 is closed and SMR 21 is also closed, power transmission is ready between inlet 28 and power storage device 20.

Power conversion device 27 is electrically connected between charging and discharging relay 26 and inlet 28. In response to a command from ECU 100, power conversion device 27 converts power received from EMS 53 into the charging power, or converts power received from power storage device 20 into power that can be fed (e.g., AC power of AC 100V).

ECU 100 is configured to include a CPU 101, a memory 102, an input/output port (not shown) through which various signals are input/output, and the like. ECU 100 controls each of devices (SMR 21, PCU 22, charging and discharging relay 26, power conversion device 27, engine 63, and the like) in vehicle 1 so that vehicle 1 establishes a desired state. Various types of control executed by ECU 100 are executed by software processing, that is, when a program stored in memory 102 is read by CPU 101. The various types of control by ECU 100 are not limited to software processing, and may instead be processed by dedicated hardware (or an electronic circuit).

Vehicle 1 further includes a navigation device 40 and a wireless communication device 50. Navigation device 40 is configured to obtain positional information of vehicle 1 (such as vehicle 1's current location, travel history and the like). Navigation device 40 includes, for example, a GPS (Global Positioning System) receiver 41 to determine the current location of vehicle 1 based on radio waves received from an artificial satellite. Navigation device 40 performs a variety of processing to navigate vehicle 1 identified by GPS receiver 41.

More specifically, navigation device 40 sets a travel route (a planned travel route or a target route) from the current location of vehicle 1 to a destination based on the GPS information of vehicle 1 and road map data stored in a memory (not shown), and transmits the information of the travel route to ECU 100. Furthermore, navigation device 40 transmits information about the current location of vehicle 1 determined using GPS receiver 41, a travel history of vehicle 1, and the like, to ECU 100, for example. ECU 100 causes memory 102 to store information obtained from navigation device 40.

Navigation device 40 further includes, for example, a touch panel-equipped display 42. Touch panel-equipped display 42 displays the current location of vehicle 1, a travel route therefor and the like superimposed on a road map, displays information received from ECU 100, and so forth. Touch panel-equipped display 42 also accepts a variety of operations performed by a user.

Wireless communication device 50 is configured to communicate a variety of information and the like with an outside of the vehicle. Wireless communication device 50 includes a long range communication module 51 and a short range communication module 52. Long range communication module 51 for example includes a long term evolution (LTE) communication module. Long range communication module 51 is configured to be capable of bidirectional data communication with base station 7 in communication network 6. Short range communication module 52 is configured to be capable of bidirectionally communicating data with portable terminal 8 of a user present within a short range (e.g., of a few meters to several tens of meters) from vehicle 1.

Further, ECU 100 transmits various information (positional information of vehicle 1 and the like) to charging/discharging device 5 and management server 10 via wireless communication device 50, and receives information (information of reservation of vehicle 1) from charging/discharging device 5 and management server 10. When information of reservation of vehicle 1 is received, ECU 100 causes memory 102 to store the received reservation information.

Further, for example while vehicle 1 is driven or it is parked and connector 32 is connected to inlet 28 so that power grid 15 and power storage device 20 can transmit and receive power therebetween, ECU 100 calculates the SOC of power storage device 20.

The SOC can be calculated in a variety of methods, such a method by accumulating values of a current (coulomb counts), a method by estimation of open circuit voltage (OCV), or the like.

While vehicle 1 is driven, ECU 100 selects one control mode of a CD (Charge Depleting) mode and a CS (Charge Sustaining) mode, and controls engine 63 and PCU 22 in the selected control mode. The CD mode is a control mode in which the SOC (State Of Charge) of power storage device 20 is consumed. The CS mode is a control mode in which the SOC of power storage device 20 is maintained within a predetermined range.

For example, after externally electrically charging power storage device 20 is completed when vehicle 1 is capable of traveling, that is, when a Ready-On state is established, then, before power storage device 20 has an SOC decreased to almost reach a control reference SOC in the CS mode (hereinafter referred to as a first target SOC), ECU 100 selects the CD mode, and once power storage device 20 has an SOC decreased to the control reference SOC in the CS mode, ECU 100 selects the CS mode.

Figure 3:
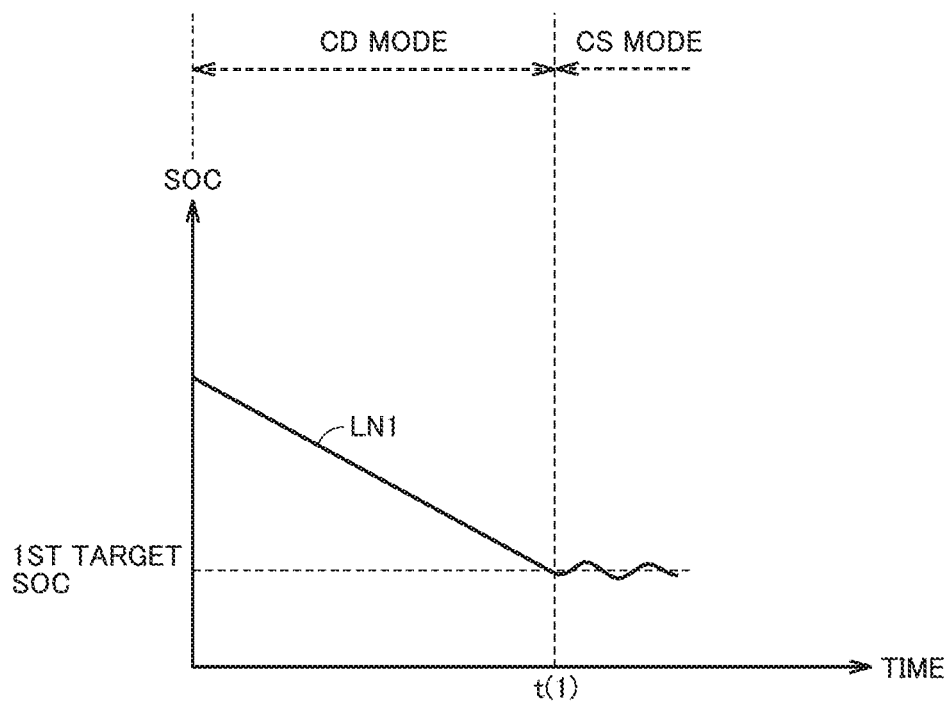
FIG. 3 is a diagram for illustrating a CD mode and a CS mode.

FIG. 3 is a diagram for illustrating the CD mode and the CS mode. In FIG. 3, the horizontal axis represents time. In FIG. 3, the vertical axis represents power storage device 20 in SOC. In FIG. 3, LN1 (a solid line) represents how power storage device 20 varies with time in SOC.

Once vehicle 1 has established the Ready-On state, the CD mode is set. In the CD mode, the vehicle basically consumes power stored in power storage device 20 (mainly consumes externally charged power). While traveling in the CD mode, engine 63 does not operate in order to maintain the SOC. That is, the CD mode includes a control mode to cause vehicle 1 to travel using second MG 62 with engine 63 stopped. Accordingly, while the SOC may temporarily be increased by regenerative power of second MG 62 being decelerated, consequently, discharging has a larger ratio than charging, and the SOC gradually decreases as a whole.

Accordingly, as indicated in FIG. 3 by LN1, power storage device 20 will have an SOC decreasing as time elapses immediately before time t(1).

At time t(1), while the vehicle travels in the CD mode when power storage device 20 has an SOC decreased to the control reference in the CS mode, or the first target SOC, ECU 100 switches the control mode from the CD mode to the CS mode. Once ECU 100 has switched the control mode from the CD mode to the CS mode, ECU 100 starts engine 63.

In the CS mode, the SOC of power storage device 20 is maintained around the first target SOC within a predetermined range defined by an upper limit control value higher than the first target SOC and a lower limit control value lower than the first target SOC. In doing so, ECU 100 operates engine 63 intermittently to maintain the SOC within the predetermined range. That is, the CS mode includes a control mode to cause vehicle 1 to travel by using second MG 62 with engine 63 operated.

Specifically, once the SOC of power storage device 20 has decreased to the lower limit control value, ECU 100 operates engine 63, and once the SOC of power storage device 20 has reached the upper limit control value, ECU 100 stops engine 63 to maintain the SOC within the predetermined range. That is, in the CS mode, engine 63 operates in order to maintain the SOC within the predetermined range. Further, when power storage device 20 has an SOC higher than the first target SOC, ECU 100 promotes discharging power storage device 20, whereas when power storage device 20 has an SOC lower than the first target SOC, ECU 100 controls output of engine 63 to promote charging power storage device 20.

Charging/discharging device 5 is provided with EMS 53, a communication device 54, and an electric device 58. EMS 53 is connected to vehicles 1 to 4, power grid 15, and electric device 58. EMS 53 includes an input/output unit 53*a* that transmits and receives power to and from vehicle 1, an input/output unit 53*b* that transmits and receives power to and from power grid 15, an output unit 53*c* that supplies power to electric device 58, an input/output unit 53*d* that transmits and receives power to and from vehicle 2, an input/output unit 53*e* that transmits and receives power to and from vehicle 3, and an input/output unit 53*f* that transmits and receives power to and from vehicle 4. Communication device 54 is configured to be communicable with wireless communication device 50 of vehicle 1 and configured to be communicable with management server 10 via communication network 6. EMS 53 communicates information with vehicle 1 via communication device 54 and communicates information with management server 10.

EMS 53 includes, for example, a power conversion device and a control device. EMS 53 receives power from power grid 15 and supplies the received power to electric device 58 and vehicle 1, and adjusts an amount of power supplied to vehicle 1. Alternatively, EMS 53 receives power from vehicle 1 and supplies the received power to electric device 58 and power grid 15, and adjusts an amount of power supplied to power grid 15.

Vehicle 1 having such a configuration receives power from power grid 15 and electrically charges power storage device 20 therewith, and supplies power from vehicle 1 as a power source via power grid 15 to another destination receiving power, as seen in a smart grid, as has been discussed above.

Furthermore, in recent years, renewable energy generated by solar photovoltaic power generation systems or the like is supplied to power grid 15 to resolve shortage of power supplied during the daytime. However, as solar photovoltaic power generation systems are increasingly used, a daytime demand for power decreases, whereas as more and more electric powered vehicles, such as vehicle 1, are used, more and more vehicles are electrically charged at night, resulting in an increased demand for power. As a result, a daily demand for power steeply fluctuates between daytime and nighttime, that is, the demand for power presents a so-called duck curve phenomenon.

Figure 4:
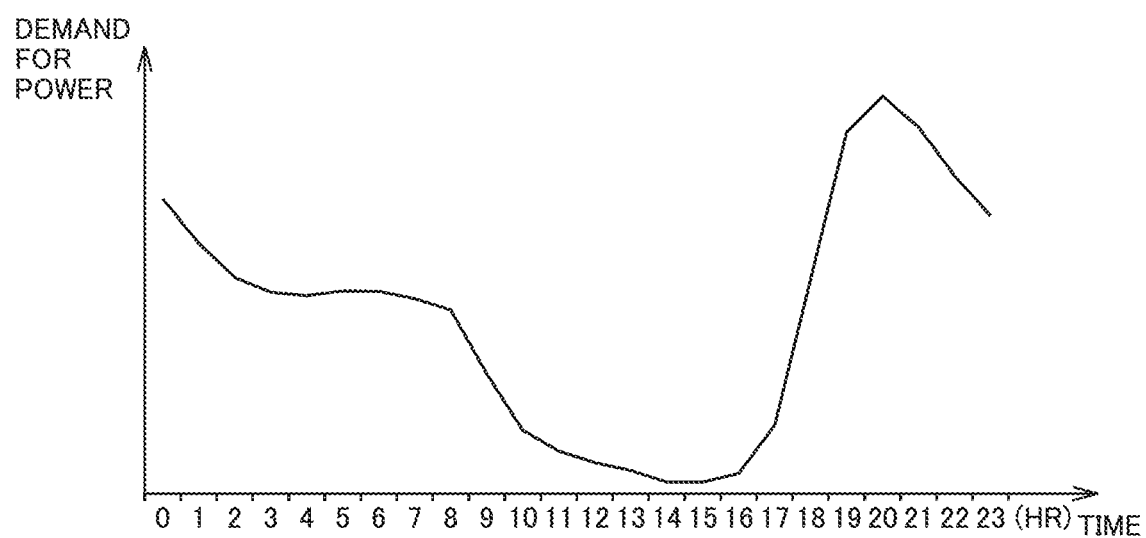
FIG. 4 represents an example of how a demand for power varies in an area in which a solar photovoltaic energy power generation system and externally chargeable electric powered vehicles are widely used.

FIG. 4 represents an example of how a demand for power varies in an area in which a solar photovoltaic energy power generation system and externally chargeable electric powered vehicles are widely used. In FIG. 4, the vertical axis represents a demand for power. In FIG. 4, the horizontal axis represents time. The demand for power represents power that power grid 15 is required to satisfy.

As shown in FIG. 4, a period up to 8 o'clock includes a period before sunrise, and solar photovoltaic power generation cannot be performed in such a period. Furthermore, the period up to 8 o'clock includes a period for which many of the residents in the area of interest are sleeping, and for such a period the demand for power has small fluctuation.

On the other hand, after 8 o'clock, as the sun rises, solar photovoltaic power generation is performed, and a portion of the power consumed in the houses in the area of interest is supplemented by the power generated by solar photovoltaic power generation. This results in a lower demand for power than in the period up to 8 o'clock. In addition, after 8 o'clock, as the sun rises higher, solar photovoltaic power generation generates more power, and accordingly, the demand for power further decreases. And as the sun goes down, solar photovoltaic power generation generates less power, and accordingly, the demand for power increases. After 18:00, the sun sets, and solar photovoltaic power generation can no longer be performed, and in addition, residents who have come home use electric equipment in their houses and also electrically charge their electric powered vehicles, which results in a rapidly increasing demand for power. This results in a daily demand for power steeply fluctuating between daytime and nighttime, that is, the demand for power presents a so-called duck curve phenomenon. Accordingly, there is a demand for reduction of fluctuation of the demand for power.

As an example of a technique for reducing such fluctuation of a demand for power, for example, such fluctuation of the demand for power may be suppressed by requesting any electric powered vehicle within an area of interest to externally feed power by discharging a predetermined amount of power during a partial period of night time for which there is a relatively large demand for power per day (hereinafter this period of time will be referred to as a discharging period). Such an electric powered vehicle also includes an electric powered vehicle used for car sharing.

Accordingly, in the present embodiment, when a scheduled time to return vehicle 1 is a time within a predetermined time zone for which power is supplied from power storage device 20 to power grid 15, or a discharging period, and the CD mode is currently selected, then, ECU 100 of vehicle 1 switches the CD mode to the CS mode in response to the power storage device having an SOC decreased to a second target SOC larger than the first target SOC while the CD mode is selected.

Thus, when a scheduled time to return a vehicle is a time within a discharging period, the CD mode is switched to the CS mode in response to power storage device 20 having an SOC decreased to the second target SOC. Thus, when vehicle 1 is returned within the discharging period at the scheduled time to return the vehicle, power storage device 20 can supply power to power grid 15. Thereby, for example, power grid 15 can receive power during the discharging period for which there is an increased demand for power, which can contribute to leveling the demand for power. In the present embodiment will be described a case where a period of time from 18:00 to 23:00 is set as a discharging period by way of example.

Figure 5:
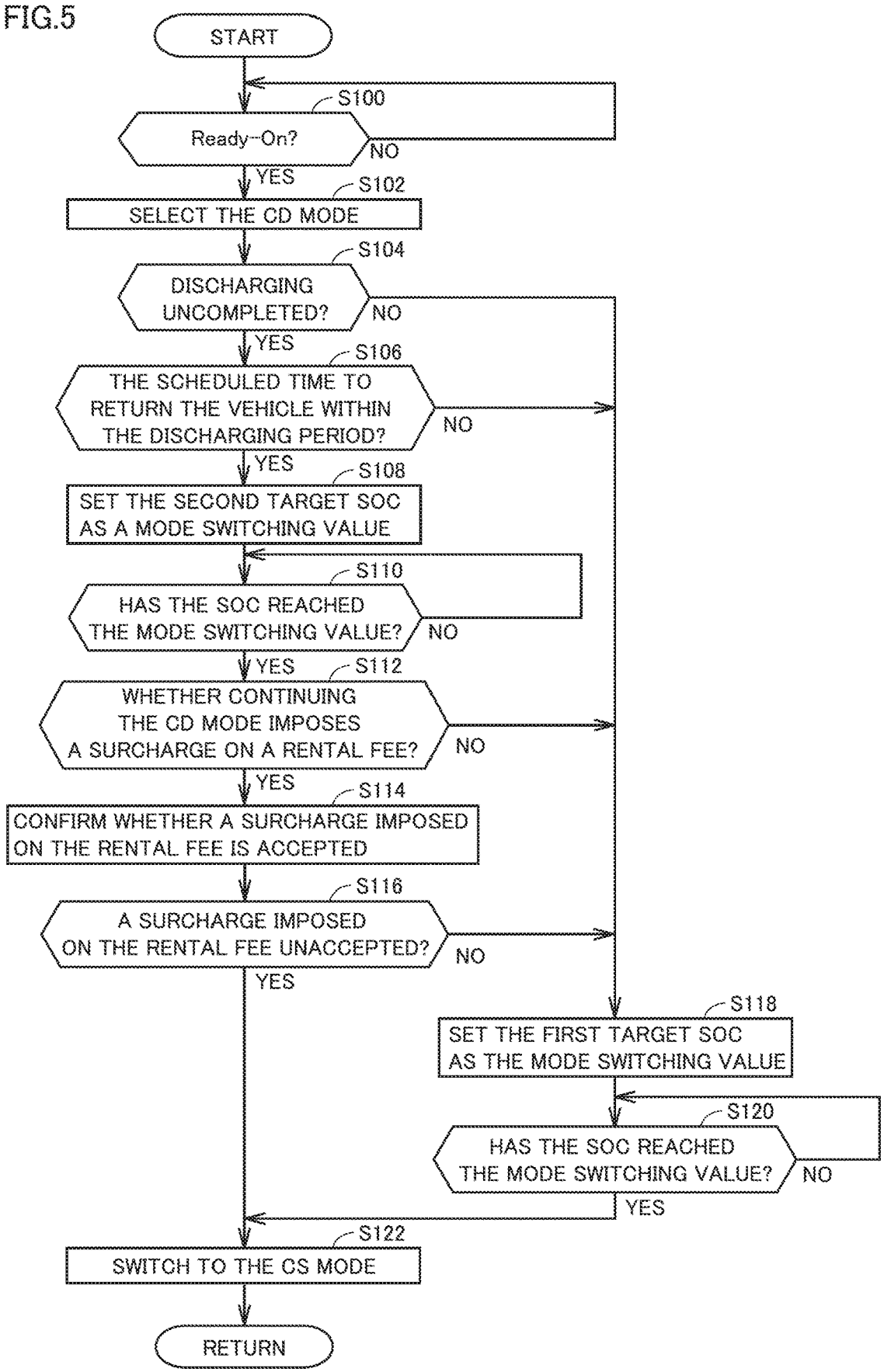
FIG. 5 is a flowchart of an example of a process performed by an ECU.

Hereinafter, a process performed by ECU 100 will be described with reference to FIG. 5. FIG. 5 is a flowchart of an example of a process performed by ECU 100. The process shown in this flowchart is repeated periodically, as predetermined, by ECU 100 shown in FIG. 1.

In step (hereinafter indicated as S) 100, ECU 100 determines whether vehicle 1 is in the Ready-On state. For example, when connector 32 is removed from inlet 28 and a system of vehicle 1 is in the off state, and in that condition a start button (not shown) is pressed, ECU 100 activates the system of vehicle 1 (that is, sets the electronics involved in traveling to an operable state) to thus set vehicle 1 to the Ready-ON state. At the time, ECU 100 determines that vehicle 1 is in the Ready-On state. When it is determined that vehicle 1 is in the Ready-On state (YES in S100), the process proceeds to S102. When it is not determined that vehicle 1 is in the Ready-On state (NO in S100), the process is returned to S100.

In S102, ECU 100 selects the CD mode. In S104, ECU 100 determines whether discharging an amount of power assigned to vehicle 1 to be discharged during the discharging period (hereinafter referred to as an "assigned amount") is uncompleted. For example, ECU 100 determines whether discharging the assigned amount is uncompleted based on a state of a flag which is set to an on state once the assigned amount has completely been discharged and which remains in the on state until the next day (hereinafter referred to as a discharging completed flag). When it is determined that discharging the assigned amount is uncompleted (YES in S104), the process proceeds to S106.

In S106, ECU 100 determines whether the scheduled time to return vehicle 1 is a time within the discharging period. For example, ECU 100 reads reservation information from memory 102 and determines whether the scheduled time to return vehicle 1 is a time within the discharging period of the same day as the scheduled time to return the vehicle. Information about the discharging period may be stored in memory 102 in advance or may be transmitted from management server 10. When ECU 100 determines that the scheduled time to return vehicle 1 is a time within the discharging period (YES in S106), the process proceeds to S108.

In S108, ECU 100 sets the second target SOC as a mode switching value. The second target SOC has a value larger than the first target SOC, and it is such a value that when vehicle 1 is returned within the discharging period, the assigned amount can be discharged (that is, it is such a value that even when the assigned amount is discharged, power storage device 20 has an SOC equal to or larger than the lower limit SOC value). ECU 100 may set as the second target SOC a predetermined value or the lower limit value of the SOC of power storage device 20 plus a variation in SOC equivalent to an amount assigned to be discharged.

In S110, ECU 100 determines whether the SOC of power storage device 20 has reached the mode switching value. For example, ECU 100 determines that the SOC of power storage device 20 has reached the mode switching value when the SOC of power storage device 20 is equal to or less than the mode switching value. When it is determined that the SOC of power storage device 20 has reached the mode switching value (YES in S110), the process proceeds to S112. When it is determined that the SOC of power storage device 20 has not reached the mode switching value (NO in S110), the process is returned to S110.

In S112, ECU 100 determines whether continuing the CD mode with an SOC below the second target SOC imposes a surcharge on a rental fee. For example, when ECU 100 receives information from management server 10 indicating that continuing the CD mode does not impose a surcharge on the rental fee, ECU 100 determines that continuing the CD mode with an SOC below the second target SOC does not impose a surcharge on the rental fee. In contrast, for example when ECU 100 receives information from management server 10 indicating that continuing the CD mode imposes a surcharge on the rental fee, ECU 100 determines that continuing the CD mode with an SOC below the second target SOC imposes a surcharge on the rental fee. For example, when an amount assigned to vehicle 1 can be discharged by another vehicle parked in depot 9, management server 10 transmits to vehicle 1 information indicating that continuing the CD mode does not impose a surcharge on the rental fee. Furthermore, when an amount assigned to vehicle 1 to be discharged cannot be discharged by another vehicle parked in depot 9, management server 10 transmits to vehicle 1 information indicating that continuing the CD mode imposes a surcharge on the rental fee.

For example, management server 10 obtains the SOC of each hybrid vehicle parked in depot 9 excluding vehicle 1. Then, management server 10 calculates an amount of power equivalent to the current SOC of each hybrid vehicle parked in depot 9 minus the lower limit SOC value minus a total amount assigned to be discharged within depot 9. When the calculated value is larger than the amount of power assigned to vehicle 1, management server 10 determines that the amount assigned to vehicle 1 can be discharged by another vehicle parked in depot 9. When ECU 100 determines that continuing the CD mode imposes a surcharge on the rental fee (YES in S112), the process proceeds to S114.

In S114, ECU 100 inquires of the user whether the user accepts a surcharge imposed on the rental fee. Specifically, ECU 100 causes touch panel-equipped display 42 to display an inquiry image for inquiring of the user whether the user accepts a surcharge imposed on the rental fee as the CD mode is continued. The inquiry image includes, for example, a first image that is selected when a surcharge imposed on the rental fee is accepted and a second image that is selected when the surcharge imposed on the rental fee is not accepted. Alternatively, ECU 100 may audibly inquire of the user whether the user accepts a surcharge imposed on the rental fee as the CD mode is continued.

In S116, ECU 100 determines whether a surcharge imposed on the rental fee is unaccepted. ECU 100 determines that a surcharge imposed on the rental fee is unaccepted for example when the user operates touch panel-equipped display 42 to indicate that the user does not accept a surcharge imposed on the rental fee (e.g., when the user touches an area corresponding to the second image or does not touch any one of the first and second images before a predetermined period of time elapses).

ECU 100 determines that a surcharge imposed on the rental fee is accepted for example when the user operates touch panel-equipped display 42 to indicate that the user accepts a surcharge imposed on the rental fee (e.g., when the user touches an area corresponding to the first image). Note that ECU 100 may identify what is uttered by the user through voice recognition processing or the like to determine whether the user does not accept a surcharge imposed on the rental fee. When it is determined that a surcharge imposed on the rental fee is unaccepted (YES in S116), the process proceeds to S122.

When ECU 100 determines that: discharging the assigned amount is completed (NO in S104); the scheduled time to return the vehicle is not a time within the discharging period (NO in S106); continuing the CD mode does not impose a surcharge on the rental fee (NO in S112); or a surcharge imposed on the rental fee is accepted (NO in S116), the process proceeds to S118.

In S118, ECU 100 sets the first target SOC as the mode switching value. The first target SOC has been described above, and accordingly, will not be described repeatedly.

In S120, ECU 100 determines whether the SOC of power storage device 20 has reached the mode switching value. ECU 100 determines that the SOC of power storage device 20 has reached the mode switching value for example when the SOC of power storage device 20 is equal to or less than the mode switching value. When it is determined that the SOC of power storage device 20 has reached the mode switching value (YES in S120), the process proceeds to S122. When it is determined that the SOC of power storage device 20 has not reached the mode switching value (NO in S120), the process returns to S120. In S122, ECU 100 switches the current control mode, that is, the CD mode, to the CS mode.

Figure 6:
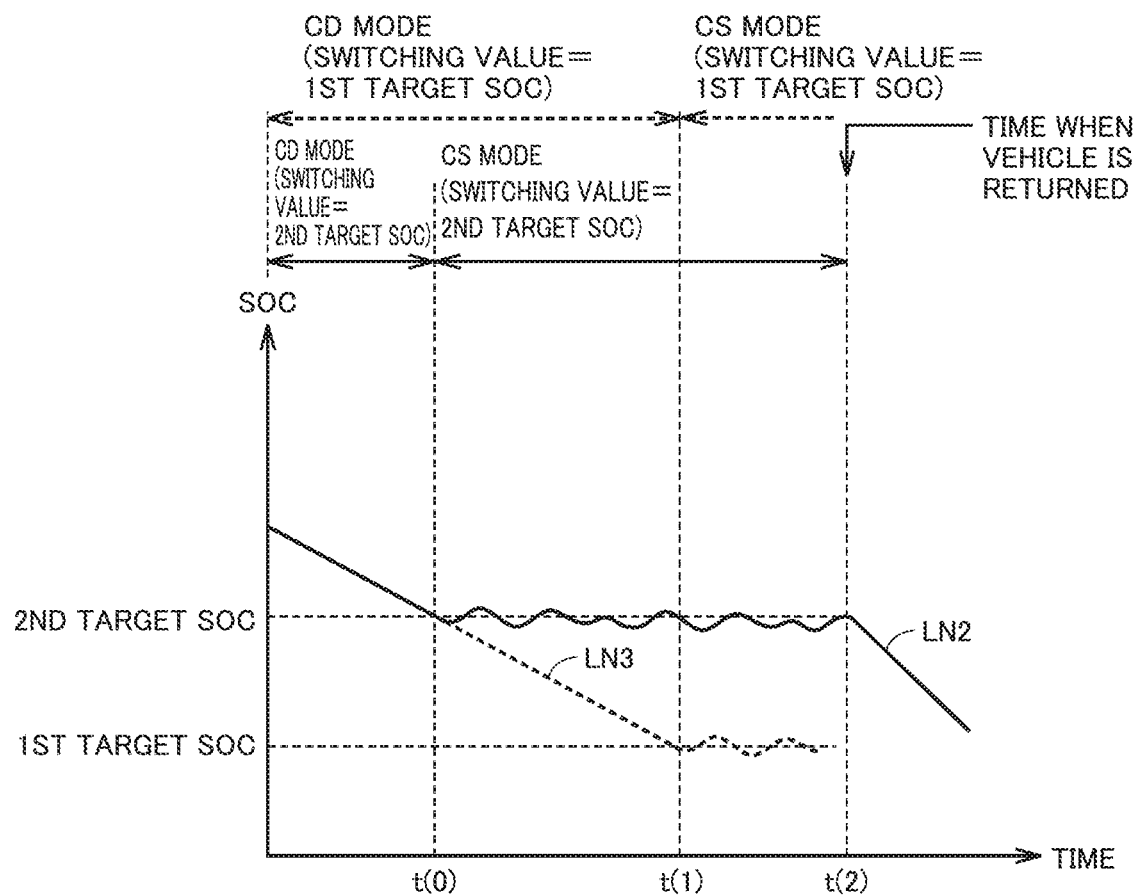
FIG. 6 is timing plots representing an example of an operation of the ECU.

An operation of ECU 100 based on the above-described structure and flowchart will be described with reference to FIG. 6. FIG. 6 is timing plots for illustrating an operation of ECU 100. In FIG. 6, the horizontal axis represents time and the vertical axis represents SOC. In FIG. 6, LN2 (a solid line) represents how power storage device 20 varies in SOC when a scheduled time to return a vehicle is a time within a discharging period. In FIG. 6, LN3 (a broken line) represents how power storage device 20 varies in SOC when the scheduled time to return the vehicle is a time within the discharging period and a surcharge imposed on a rental fee is not incurred.

<Switching the CD Mode to the CS Mode at the Second Target SOC>

When vehicle 1 establishes the Ready-On state (YES in S100), the CD mode is selected (S102). When vehicle 1 travels with the CD mode selected, then, as indicated in FIG. 6 by LN2, before time t(0), power storage device 20 will have an SOC decreasing as time elapses.

Furthermore, when discharging the assigned amount is uncompleted (YES in S104) and the scheduled time to return vehicle 1 is a time within the discharging period (YES in S106), the second target SOC is set as a mode switching value (S108).

Accordingly, as indicated in FIG. 6 by LN2, at time t(0), when the SOC of power storage device 20 has reached the mode switching value or the second target SOC (YES in S110), whether continuing the CD mode imposes a surcharge on a rental fee is determined (S112).

When information indicating that continuing the CD mode imposes a surcharge on the rental fee has been received from management server 10 (YES in S112), whether the surcharge imposed on the rental fee is accepted is confirmed (S114). When the user operates touch panel-equipped display 42 to indicate that the user does not accept the surcharge imposed on the rental fee (YES in S116), the current mode is switched to the CS mode (S122).

Accordingly, as indicated in FIG. 6 by LN2, at time t(0) et. seq., power storage device 20 has an SOC controlled around the second target SOC and accordingly, fluctuating around the second target SOC.

At time t(2), when vehicle 1 is returned to depot 9 within the discharging period at the scheduled time to return vehicle 1 and connector 32 is connected to inlet 28 of vehicle 1, a predetermined amount of power to be discharged from vehicle 1 to power grid 15 will be discharged, as discharging the power of an amount assigned to vehicle 1 is uncompleted. Accordingly, at time t(2) et. seq., power storage device 20 will have an SOC decreasing as time elapses.

<Switching the CD Mode to the CS Mode at the First Target SOC>

When vehicle 1 establishes the Ready-On state (YES in S100), the CD mode is selected (S102). When vehicle 1 travels with the CD mode selected, then, as well as indicated in FIG. 6 by LN2, before time t(0), power storage device 20 will have an SOC decreasing as time elapses.

Furthermore, when discharging the assigned amount is uncompleted (YES in S104) and the scheduled time to return vehicle 1 is a time within the discharging period (YES in S106), the second target SOC is set as the mode switching value (S108).

At time t(0), when the SOC of power storage device 20 has reached the mode switching value or the second target SOC (YES in S110), whether continuing the CD mode imposes a surcharge on a rental fee is determined (S112).

For example, when it is determined that an amount assigned to vehicle 1 can be discharged by another vehicle parked in depot 9, management server 10 transmits to vehicle 1 information indicating that continuing the CD mode does not impose a surcharge on the rental fee. When vehicle 1 receives such information, it is determined that continuing the CD mode does not impose a surcharge on the rental fee (NO in S112), and the first target SOC is set as the mode switching value (S118).

Alternatively, when information indicating that continuing the CD mode imposes a surcharge on the rental fee has been received from management server 10 (YES in S112), whether the surcharge imposed on the rental fee is accepted is confirmed (S114). For example, the vehicle travels in an area which requires suppressed exhaust gas emission (e.g., a ZEV (Zero Emission Vehicle) area), and the user may desire continuing the CD mode even when doing so imposes a surcharge on a rental fee. In that case, the user operates touch panel-equipped display 42 to indicate that the user accepts the surcharge imposed on the rental fee (NO in S116), and the first target SOC is set as the mode switching value (S118).

Alternatively, when discharging the assigned amount is uncompleted (YES in S104) and the scheduled time to return vehicle 1 is not a time within the discharging period (NO in S106), the first target SOC is set as the mode switching value (S118).

Once the first target SOC has been set as the mode switching value, then, as indicated in FIG. 6 by LN3, at time t(0) et. seq., even when power storage device 20 has an SOC below the second target SOC, the SOC of power storage device 20 will decrease as time elapses. At time t(1), when the SOC of power storage device 20 has reached the mode switching value or the first target SOC (YES in S120), the current control mode, or the CD mode, is switched to the CS mode (S122).

Accordingly, at time t(1) et. seq., power storage device 20 has an SOC controlled around the first target SOC and accordingly, fluctuating around the first target SOC.

Thus, according to the hybrid vehicle of the present embodiment, when a scheduled time to return the vehicle is a time within the discharging period, the CD mode is switched to the CS mode in response to power storage device 20 having an SOC decreased to the second target SOC. Thus, when vehicle 1 is returned within the discharging period at the scheduled time to return the vehicle power storage device 20 can supply power to power grid 15. Power grid 15 can thus receive power during the discharging period for which there is an increased demand for power. Accordingly, each individual hybrid vehicle in depot 9 can be used as a power generation source during the discharging period. This can contribute to leveling a demand for power. A hybrid vehicle used for car-sharing and allowing a power supply source mounted therein and a power grid to transmit and receive power therebetween, that contributes to leveling a demand for power, and a method for controlling the hybrid vehicle, can thus be provided.

Furthermore, when a scheduled time to return a vehicle is a time within the discharging period, the CD mode is currently selected and power storage device 20 has an SOC decreased to the second target SOC, and an operation performed by a user to indicate that the user accepts a surcharge imposed on a rental fee by continuing the CD mode is received, then, the CD mode selected is switched to the CS mode in response to power storage device 20 having an SOC decreased to the first target SOC while the CD mode is selected.

By performing an operation to accept a surcharge imposed on a rental fee, the CD mode is switched from the CS mode when power storage device 20 has an SOC decreased to the first target SOC lower than the second target SOC, which allows electrically driven traveling to continue for a longer period of time than when switching the CD mode to the CS mode when an SOC has decreased to the second target SOC.

Furthermore, when the scheduled time to return a vehicle is a time within the discharging period, the CD mode is currently selected and power storage device 20 has an SOC decreased to the second target SOC, and information is received indicating that a predetermined amount of power to be discharged to power grid 15 can be discharged by another vehicle owned by a business conductor of rental service of car sharing, then, the CD mode selected is switched to the CS mode in response to the power storage device having an SOC decreased to the first target SOC lower than the second target SOC while the CD mode is selected.

When a predetermined amount of power to be discharged to power grid 15 can be discharged by another vehicle owned by a business conductor of car sharing, and the CD mode is currently selected, the CD mode is switched to the CS mode in response to the power storage device having an SOC decreased to the first target SOC lower than the second target SOC while the CD mode is selected, and the user can thus obtain electrically driven traveling continued for a longer period of time than when switching the CD mode to the CS mode when an SOC has decreased to the second target SOC.

Hereinafter, a modification will be described.

While in the above-described embodiment, connector 32 is attached to inlet 28 to allow EMS 53 and power storage device 20 to transmit and receive power therebetween by way of example, EMS 53 and power storage device 20 may contactlessly transmit and receive power therebetween.

Further, while in the above-described embodiment, vehicle 1 has been described as a hybrid vehicle with first MG 61, engine 63, and second MG 62 connected by power split device 64 by way of example, vehicle 1 may be a hybrid vehicle that can externally feed power and for example it may be a hybrid vehicle in a different system such as a series system.

Further, in the above-described embodiment, requesting vehicle 1 to discharge a predetermined amount of power within the discharging period has been described as an example. Alternatively, for example, the power management server estimates how a daily demand for power fluctuates in a predetermined area and when the power management server estimates that the demand for power increases to be larger than usual within the discharging period, the power management server may: request vehicle 1 via management server 10 to discharge an amount of power increased to be larger than a predetermined amount; request each of a plurality of vehicles including vehicle 1 via management server 10 to discharge an amount of power increased to be larger than a predetermined amount; or set an amount of power to be discharged that is different for each of a plurality of vehicles including vehicle 1, depending on the capacity, SOC or the like of the power storage device mounted in each vehicle, and request management server 10 to provide the set amount of power to be discharged. Management server 10 may adjust in SOC the power storage device mounted in each hybrid vehicle parked in depot 9 to be able to discharge an amount of power requested to be discharged.

Furthermore, in the above embodiment, when a predetermined amount of power to be discharged to power grid 15 can be discharged by another vehicle owned by a business conductor of car sharing and parked in depot 9, and the CD mode is currently selected, the CD mode is switched to the CS mode in response to power storage device 20 having an SOC decreased to the first target SOC while the CD mode is selected, by way of example. However, such switching is not limited to when the predetermined amount of power to be discharged to the power grid can be discharged. For example, when a predetermined amount of power to be discharged to power grid 15 can be at least partially discharged by another vehicle owned by a business conductor of car sharing and parked in depot 9, and the CD mode is currently selected, the CD mode may be switched to the CS mode in response to the power storage device having an SOC decreased to a target SOC lower than the second target SOC while the CD mode is selected. The target SOC may be set depending on an amount of power dischargeable to power grid 15.

Further, in the above-described embodiment, the mode switching value is set to the first target SOC when the user accepts a surcharge imposed on a rental fee by way of example. Alternatively, it is sufficient to set at least a value lower than the second target SOC as the mode switching value and it is not limited to setting the mode switching value to the first target SOC.

Further, in the above-described embodiment, as shown in the FIG. 5 flowchart, when the SOC of power storage device 20 has reached a mode switching value that is the second target SOC (YES in S110), whether continuing the CD mode imposes a surcharge on a rental fee is determined (S112), whether the surcharge imposed on the rental fee is accepted is confirmed (S114), and whether the surcharge imposed on the rental fee is unaccepted is determined (S116) by way of example. Alternatively, step S112 may be dispensed with, steps S114 and S116 may be dispensed with, or steps S112, S114, and S116 may be dispensed with.

It should be noted that the above modifications may be implemented all together or partially in combination.

It should be understood that the embodiments disclosed herein have been described for the purpose of illustration only and in a non-restrictive manner in any respect. The scope of the present disclosure is defined by the terms of the claims, and is intended to include any modifications within the meaning and scope equivalent to the terms of the claims.

What is claimed is:

1. A hybrid vehicle used for a rental service, comprising:
an electric motor that generates a driving force;
a power storage device that stores power to be supplied to the electric motor;
an engine that is used to generate power;
a connector connected to a power grid external to the hybrid vehicle to allow the power grid external to the hybrid vehicle and the power storage device to transmit and receive power therebetween while the hybrid vehicle is parked; and
a control device that controls the hybrid vehicle in accordance with any one control mode of a first mode and a second mode while the hybrid vehicle is driven, the first mode allowing the hybrid vehicle to travel using the electric motor with the engine stopped, the second mode allowing the hybrid vehicle to travel with the engine operated, wherein
the control device switches the first mode to the second mode in response to the power storage device having an SOC decreased to a first target SOC during the first mode, and
when a scheduled time to return the hybrid vehicle is within a predetermined time zone for which power is supplied from the power storage device to the power grid, the control device switches the first mode to the second mode in response to the power storage device having an SOC decreased to a second target SOC larger than the first target SOC during the first mode.

2. The hybrid vehicle according to claim 1, wherein when the scheduled time to return the hybrid vehicle is within the predetermined time zone, and when an operation performed by a user to indicate that the user accepts a surcharge imposed on a rental fee by continuing the first mode is received, the control device switches the first mode to the second mode in response to the power storage device having an SOC decreased to an SOC lower than the second target SOC during the first mode.

3. The hybrid vehicle according to claim 1, wherein when the scheduled time to return the hybrid vehicle is within the predetermined time zone, and when information indicating that another vehicle owned by a business conductor of the rental service can supply the power grid with power is received, then, the control device switches the first mode to the second mode in response to the power storage device having an SOC decreased to an SOC lower than the second target SOC during the first mode.

4. A method for controlling a hybrid vehicle used in a rental service, the hybrid vehicle including an electric motor that generates a driving force, a power storage device that stores power to be supplied to the electric motor, an engine that is used to generate power, and a connector connected to a power grid external to the hybrid vehicle to allow the power grid external to the hybrid vehicle and the power storage device to transmit and receive power therebetween while the hybrid vehicle is parked, the method comprising:
controlling the hybrid vehicle in accordance with any one control mode of a first mode and a second mode while the hybrid vehicle is driven, the first mode allowing the hybrid vehicle to travel using the electric motor with the engine stopped, the second mode allowing the hybrid vehicle to travel with the engine operated;
switching the first mode to the second mode in response to the power storage device having an SOC decreased to a first target SOC during the first mode; and
when a scheduled time to return the hybrid vehicle is within a predetermined time zone for which power is supplied from the power storage device to the power grid, switching the first mode to the second mode in response to the power storage device having an SOC decreased to a second target SOC larger than the first target SOC during the first mode.

* * * * *